R. D. JOHNSON.
VALVE.
APPLICATION FILED OCT. 8, 1909.
1,030,890.
Patented July 2, 1912.
2 SHEETS—SHEET 1.
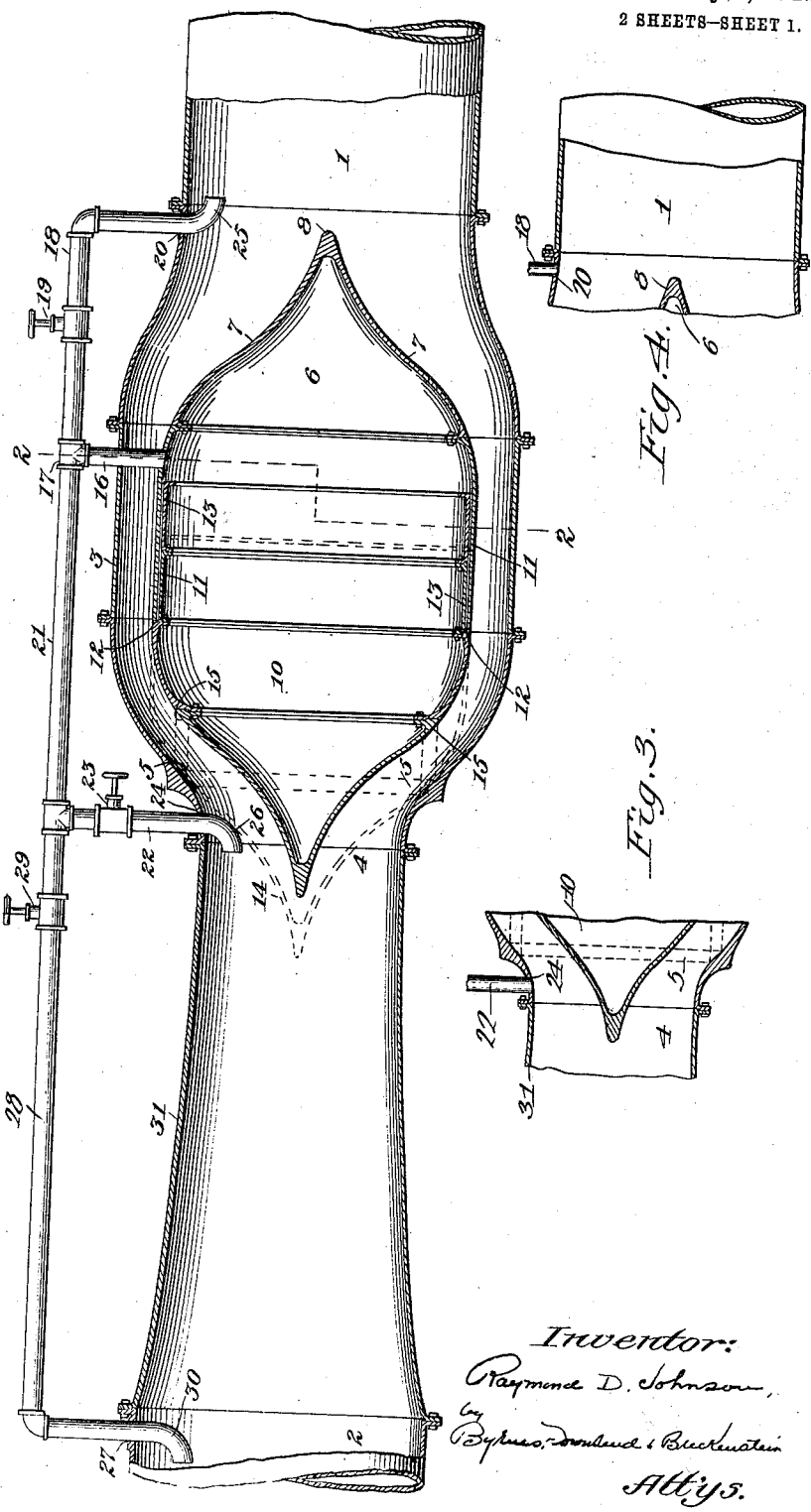

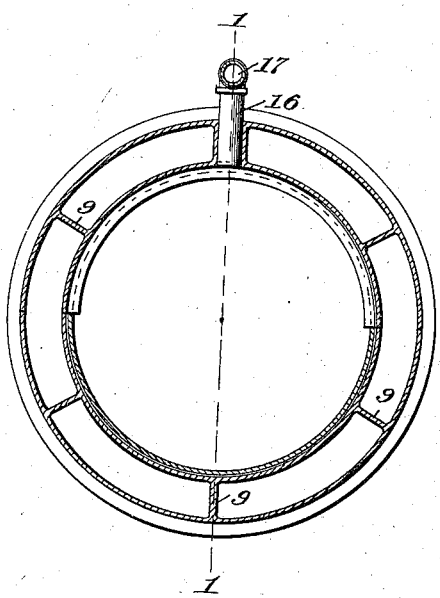

UNITED STATES PATENT OFFICE.

RAYMOND D. JOHNSON, OF NIAGARA FALLS, NEW YORK.

VALVE.

1,030,890.     Specification of Letters Patent.     Patented July 2, 1912.

Application filed October 8, 1909. Serial No. 521,729.

*To all whom it may concern:*

Be it known that I, RAYMOND D. JOHNSON, a citizen of the United States, residing at Niagara Falls, in the county of Niagara and State of New York, have invented certain new and useful Improvements in Valves, of which the following is a specification.

This invention relates to valves for the control of water, steam or other fluids, the object of the invention being the provision of a valve which when provided with suitable control pipes may be operated positively under any head or fluid pressure. When suitably connected, the operation of the valve is independent of the direction of flow of the water or other fluid; and it is also independent of the position of the valve, which may be inverted or disposed horizontally or at any desired angle without interfering in the least with its direct and positive control. Under all these conditions the valve serves not only to interrupt the fluid flow but to control or regulate the flow to any desired extent: this latter capacity adapts the valve for use in conjunction with any suitable automatic regulating device, although it is equally susceptible of manual control, and is particularly adapted for distant control, whether manual or automatic. The construction is also particularly adapted for large installations, the operation depending upon differences of pressure, and being independent of the absolute pressure or head; this renders it practicable to construct valves several feet in diameter, and to operate and control them with the utmost ease. To insure the positive opening and closing of the valve, and a positive control in all intermediate positions, it is essential, in addition to the provision of the several structural elements, that the valve or bobbin and the adjacent surfaces of the conduit or valve-chamber should be properly designed; and when properly designed the operation of the valve involves no loss of head other than the slight loss due to unavoidable friction.

Certain embodiments of the invention are illustrated in the accompanying drawings, wherein:

Figure 1 is a longitudinal sectional view of one form of hydraulic valve; Fig. 2 is a transverse section on the line II—II of Fig. 1; and Figs. 3 and 4 are sectional details of a slightly modified construction.

Referring to the drawings, 1, 2 represents a fluid conduit, which for illustration will be assumed to serve for conveying water under pressure.

3 is an enlargement of the conduit constituting a valve chamber, the lines being such as to avoid such sharp deflections of the stream as might result in loss of head due to eddy currents or churning movements of the water.

At or near one end of the valve chamber, indicated by the numeral 4, the conduit is contracted in cross-sectional area, and adjacent this contracted portion is formed an annular valve seat 5. From the contracted portion 4 the conduit increases gradually to its normal area at the point 2, through a flaring section 31 of suitable length, serving to restore the normal head with the least practicable loss.

The valve proper comprises a hollow fixed section 6 tapering by reverse curves 7 to a central apex 8: this section is mounted centrally within the valve chamber 3 by any suitable number of radial ribs 9 (Fig. 2). A movable section 10, generally similar in form to the section 6 and preferably hollow is fitted closely within the fixed section, telescoping therewith as shown at 11, and constituting the plunger bowl of the valve. In the fully open position of the valve, as illustrated in full lines in Fig. 1, the shoulder 12 on the movable section engages the marginal portion of the fixed section: The telescoping section 13 is of sufficient width to permit movement of the valve to the closed position indicated by the dotted lines 14 without disengagement of the sections. The movable section 10 has an annular seat 15 registering with the seat 5 on the valve chamber.

A pipe connection 16 extends from the interior of the fixed section 6 to a point 17 outside the valve chamber, whence valved connections extend to points in the wall of the conduit on each side of the valve chamber: thus pipe 18, having a cock 19, communicates with the conduit at a point 20 where the cross-sectional area of the conduit is not restricted; and a pipe 21, 22, having a cock 23, communicates at a point 24 with the contracted portion of the conduit. These pipes may merely open into the conduit, or one or both of them may be turned outwardly (away from the valve) forming pitometer tubes 25, 26 for a purpose hereinafter stated. The pipes extending from the fixed valve section to either side of the valve chamber are hereinafter referred to as the "control pipes." The construction wherein the pipes 20 and 22 merely open into the conduit is illustrated in Figs. 3 and 4.

As above stated, this construction is operative in any position, under suitable head or pressure, and if the pitometer tubes or equivalent devices be present, the operation is independent of the direction of flow of fluid through the conduit. The operation of the valve depends primarily upon the familiar hydraulic principle that velocity and pressure are mutually convertible in the sense that a region of relatively constricted cross-sectional area in a conduit conveying a fluid stream under pressure determines an increased velocity and a correspondingly diminished pressure at that region. Thus, in the specific construction illustrated there is, when the valve is open, a region adjacent the point of entry of the control pipe 22 where the pressure is lower than at that region of greater cross-sectional area at which the control pipe 18 enters the conduit. Therefore, assuming the stream to be flowing from 1 to 2, the cock 19 to be closed and the cock 23 open, the pressure within the hollow valve will correspond to the lower pressure at the contracted portion of the conduit, and the valve will be held in its open position, as illustrated, by the pressure and reaction of the fluid against the exterior face of the movable section or plunger bowl. If now the cock 23 be closed and the cock 19 opened, thereby transmitting to the interior of the valve the greater pressure at the uncontracted region 1 of the conduit, the valve will at once close by the outward movement of the plunger bowl 10. It should be observed that the valve seat 15 is located on the plunger bowl 10, on a diameter smaller than the plunger diameter: this is essential from a hydraulic viewpoint in order that the start to open the valve may be effected by the pressure on the submerged plunger area above the seat: this location of the seat is also essential mechanically, as if it were placed higher on the plunger bowl the wedge action might result in splitting the outer casing or chamber. It is also to be observed that the conformation of the parts is such that the variations of pressure for operating the valve are secured without loss of head other than such as may be inevitable in any closed system; and that the operation of the valve is in no way dependent upon such unavoidable losses of head.

The reaction of the fluid stream at the region 4 against the plunger bowl tends to hold the valve open and assists in opening it after the start to open: while this reaction resists closure, it occurs against a small area of the plunger and therefore does not total enough to prevent positive closure. The velocity of flow in the section of the chamber above (inward from) the region of maximum reaction is readily made sufficient to neutralize or overcome the reaction and to produce positive closing conditions under all circumstances. The adequacy of the construction for the many applications whereof it is capable calls for skilful adjustment of the curves of the plunger bowl and the adjacent walls to the conditions in view.

The work done in moving the plunger when lying within a closed system resembles in principle the operation of a water turbine, which is actuated by the conversion into mechanical movement of differences in water pressures, rather than by impact of the stream upon movable buckets as in the Pelton type of wheel: fundamentally, this principle is independent of the direction of flow of the fluid, being dependent upon the centrifugal forces exerted on the concave areas of the plunger.

Assuming the valve to be so connected that the stream flows from 2 to 1, means must be provided for increasing the fluid pressure within the plunger bowl above that attainable by a direct connection to the contracted region 4 of the conduit. This may be accomplished in various ways, as for example by the provision of the pitometer tube 26, turned outward, and serving to transmit to the interior of the valve the velocity head of flow as an added static pressure: with this provision the valve works equally well whether the flow is from 1 to 2 or from 2 to 1. In the former case closure is effected as already described by opening cock 19 and closing cock 23, and opening is effected by the reverse operation. If the direction of flow is from 2 to 1 closure is effected by opening cock 23 and closing cock 19, and opening by the reverse procedure. In either case the plunger may be made to assume any intermediate position, and maintained therein so long as conditions remain constant, by proper adjustment of the cocks 19 and 23. This adjustment may be made even simpler by combining these cocks as a single three-way cock located at the point 17, as will be readily understood. Obviously this point may be located at a distance from the hydraulic valve, or controlled from a distant point, either manually or through any suitable governing device; and the construction illustrated is to be considered as merely exemplary.

Another means for securing adequate pressure within the valve when the direction of flow is from 2 to 1, is the provision of a control pipe 28, with a cock 29, this pipe entering the main conduit at a point 27 beyond the contracted region 4 and shown as at the larger end of the taper section 31 leading thereto. I may also provide here a pitometer tube 30 turned away from the plunger, but this is not essential under all conditions. In this case the regions 2 and 4 of the conduit are to be regarded as points of high and low pressure respectively both located on the same side of the valve, and the position of the plunger may be controlled by manipulating the cocks 23 and 29 precisely as above described with reference to the cocks 19 and 23, except that the start to open would be made with both cocks closed. The leakage around the plunger would start the valve creating slight flow with consequent reduction of pressure at 4 which would immediately permit opening cock 23. In case the point 4 is thus utilized as a region of low pressure the pitometer tube 26 is not used.

The function of the pitometer tube 25, connected to the control pipe 18, is to increase the pressure within the valve by transmitting to the interior an added static pressure, when the direction of flow is from 1 to 2, thereby rendering the closure more positive. Its presence is not essential if the reverse curves of the plunger bowl and the adjacent walls are properly designed for the service in view, although it increases the positiveness of the action under the above conditions.

When the valve is vertically placed, with heavy plunger and low operating head, it sometimes becomes necessary to open the control pipe directly to air instead of to a point of low pressure and high velocity within the conduit, and this may also be done under any conditions when it is desired to increase the positiveness of opening, and the conduit is flowing full at its contracted portion. It will be understood that the portion of the conduit illustrated may be a part of a closed pressure system as for turbine operation or water works systems, or it may be open directly to air, forming a nozzle either at the point 2 or at the contracted part 4. The operation of the valve is positive in both directions under all of these conditions. In a closed system the pressure at 4 may under some conditions be below atmospheric without in any way affecting the operation.

The operation of the valve in a vertical position with the part 1 uppermost and the water flowing from 1 to 2 presents an interesting feature. In this case the valve is opened without performing the work of lifting the weight of water within the bowl, because upon opening cock 23 the pressure transmitted to the interior of the valve is reduced by the height of the water column from 17 to 23. This is highly advantageous in large valves, where the weight of water in the plunger bowl may amount to many tons.

While the form and construction of the valve may be widely varied without departure from correct principles of design and to adapt the valve for special purposes, it is nevertheless essential that technical skill be used in the design of the curves and the proportioning of the parts. The essentials of construction to secure efficient operation under all conditions are:—

(1.) The valve or bobbin comprising a fixed part and a co-acting movable plunger, both constructed with properly designed reverse curves.

(2.) The contraction of the pipe at the valve seat and under the movable plunger.

(3.) Control pipe connections to the interior of the valve, when the valve is intended to be positively operated, from points of higher and lower pressure. These are usually two points on the main conduit, and usually but not necessarily lie on opposite sides of the valves. Opening to air is equivalent to opening to a point of low pressure.

(4.) The taper section extending from the valve chamber when operating in a closed pressure system.

I claim:

1. In combination, a fluid conduit having a contracted portion constituting a region of relatively low fluid-pressure, a valve seat adjacent said contracted portion, a hollow sectional valve adapted to seat thereon, the movable section of said valve formed with reverse curves, pipe connections from the interior of said valve to regions of higher and lower fluid-pressure, and controlling means for said pipes.

2. In combination, a fluid conduit having a contracted portion constituting a region of relatively low fluid-pressure, a valve seat adjacent said contracted portion, a hollow sectional valve adapted to seat thereon, the movable section of said valve formed with reverse curves, pipe connections from the interior of said valve to regions of higher and lower fluid-pressure both located within said conduit, and controlling means for said pipes.

3. In combination, a fluid conduit having a contracted portion constituting a region of relatively low fluid-pressure, a flaring section leading therefrom; a valve seat adjacent said contracted portion, a hollow sectional valve adapted to seat thereon, the movable section of said valve formed with reverse curves, pipe connections from the interior of said valve to regions of higher and lower fluid-pressure, and controlling means for said pipes.

4. In combination, a fluid conduit having a contracted portion constituting a region of relatively low fluid pressure, a valve seat adjacent said contracted portion, a hollow sectional valve adapted to seat thereon, the movable section of said valve formed with reverse curves, and a pipe connection extending from the interior of said valve to a region of high fluid pressure.

In testimony whereof, I affix my signature in presence of two witnesses.

RAYMOND D. JOHNSON.

Witnesses:
 GEO. R. SHEPARD,
 W. W. LAMB.